US008514197B2

(12) United States Patent
Shahraray et al.

(10) Patent No.: US 8,514,197 B2
(45) Date of Patent: *Aug. 20, 2013

(54) MULTIMODAL PORTABLE COMMUNICATION INTERFACE FOR ACCESSING VIDEO CONTENT

(75) Inventors: Behzad Shahraray, Holmdel, NJ (US); David Crawford Gibbon, Lincroft, NJ (US); Bernard S. Renger, New Providence, NJ (US); Zhu Liu, Middletown, NJ (US); Andrea Basso, Marlboro, NJ (US); Mazin Gilbert, Warren, NJ (US); Michael J. Johnston, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,722

(22) Filed: Aug. 8, 2012

(65) Prior Publication Data
US 2012/0304239 A1  Nov. 29, 2012

Related U.S. Application Data

(63) Continuation of application No. 12/283,512, filed on Sep. 12, 2008, now Pat. No. 8,259,082.

(51) Int. Cl.
*G06F 3/041* (2006.01)
(52) U.S. Cl.
USPC ............................ 345/173; 704/235; 725/115
(58) Field of Classification Search
USPC .................................. 345/173–184; 715/700
See application file for complete search history.

(56) References Cited

U.S. PATENT DOCUMENTS

| 5,614,940 A | 3/1997 | Cobbley et al. |
| 5,664,227 A | 9/1997 | Mauldin et al. |
| 5,708,767 A | 1/1998 | Yeo et al. |
| 5,710,591 A | 1/1998 | Bruno et al. |
| 5,805,763 A | 9/1998 | Lawler et al. |
| 5,821,945 A | 10/1998 | Yeo et al. |
| 5,835,087 A | 11/1998 | Herz et al. |
| 5,835,667 A | 11/1998 | Wactlar et al. |
| 5,864,366 A | 1/1999 | Yeo |

(Continued)

FOREIGN PATENT DOCUMENTS
WO    9627840    9/1996

OTHER PUBLICATIONS

Shahraray, B., "Scene Change Detection and Content-based Sampling of Video Sequences", Proc. SPIE 2419, Digital Video Comp.: Algorithms Tech., p. 2-13, 1995.

(Continued)

*Primary Examiner* — Kevin M Nguyen
*Assistant Examiner* — Kenneth B Lee, Jr.
(74) *Attorney, Agent, or Firm* — Wolff & Samson, PC

(57) ABSTRACT

A portable communication device has a touch screen display that receives tactile input and a microphone that receives audio input. The portable communication device initiates a query for media based at least in part on tactile input and audio input. The touch screen display is a multi-touch screen. The portable communication device sends an initiated query and receives a text response indicative of a speech to text conversion of the query. The portable communication device then displays video in response to tactile input and audio input.

12 Claims, 7 Drawing Sheets

(56) References Cited

U.S. PATENT DOCUMENTS

| | | | |
|---|---|---|---|
| 5,874,986 | A | 2/1999 | Gibbon et al. |
| 5,999,985 | A | 12/1999 | Sebestyen |
| 6,038,296 | A | 3/2000 | Brunson et al. |
| 6,092,107 | A | 7/2000 | Eleftheriadis et al. |
| 6,098,082 | A | 8/2000 | Gibbon et al. |
| 6,166,735 | A | 12/2000 | Dom et al. |
| 6,233,389 | B1 | 5/2001 | Barton et al. |
| 6,236,395 | B1 | 5/2001 | Sezan et al. |
| 6,243,676 | B1 | 6/2001 | Witteman |
| 6,282,549 | B1 | 8/2001 | Hoffert et al. |
| 6,289,346 | B1 | 9/2001 | Milewski et al. |
| 6,304,898 | B1 | 10/2001 | Shiigi |
| 6,324,338 | B1 | 11/2001 | Wood et al. |
| 6,324,512 | B1 | 11/2001 | Junqua et al. |
| 6,345,279 | B1 | 2/2002 | Li et al. |
| 6,363,380 | B1 | 3/2002 | Dimitrova |
| 6,385,306 | B1 | 5/2002 | Baxter |
| 6,453,355 | B1 | 9/2002 | Jones et al. |
| 6,460,075 | B2 | 10/2002 | Krueger et al. |
| 6,477,565 | B1 | 11/2002 | Daswani et al. |
| 6,477,707 | B1 | 11/2002 | King et al. |
| 6,496,857 | B1 | 12/2002 | Dustin et al. |
| 6,564,263 | B1 | 5/2003 | Bergman et al. |
| 6,678,890 | B1 | 1/2004 | Cai |
| 6,810,526 | B1 | 10/2004 | Menard et al. |
| 6,956,573 | B1 | 10/2005 | Bergen et al. |
| 6,961,954 | B1 | 11/2005 | Maybury et al. |
| 6,970,915 | B1 | 11/2005 | Partovi et al. |
| 7,046,230 | B2 | 5/2006 | Zadesky et al. |
| 7,130,790 | B1 | 10/2006 | Flanagan et al. |
| 7,178,107 | B2 | 2/2007 | Sezan et al. |
| 7,505,911 | B2 | 3/2009 | Roth et al. |
| 8,259,082 | B2 * | 9/2012 | Shahraray et al. ............ 345/173 |
| 2001/0013123 | A1 | 8/2001 | Freeman et al. |
| 2001/0049826 | A1 | 12/2001 | Wilf |
| 2002/0052747 | A1 | 5/2002 | Sarukkai |
| 2002/0093591 | A1 | 7/2002 | Gong et al. |
| 2002/0100046 | A1 | 7/2002 | Dudkiewicz |
| 2002/0138843 | A1 | 9/2002 | Samaan et al. |
| 2002/0152464 | A1 | 10/2002 | Kitsukawa et al. |
| 2002/0152477 | A1 | 10/2002 | Goodman et al. |
| 2002/0173964 | A1 | 11/2002 | Reich |
| 2003/0182125 | A1 * | 9/2003 | Phillips et al. ............. 704/270.1 |
| 2004/0117831 | A1 | 6/2004 | Ellis et al. |
| 2005/0028194 | A1 | 2/2005 | Elenbaas et al. |
| 2005/0052425 | A1 | 3/2005 | Zadesky et al. |
| 2005/0076357 | A1 | 4/2005 | Fenne |
| 2005/0076378 | A1 | 4/2005 | Omoigui |
| 2005/0110768 | A1 | 5/2005 | Marriott et al. |
| 2005/0223408 | A1 | 10/2005 | Langseth et al. |
| 2005/0278741 | A1 | 12/2005 | Robarts et al. |
| 2006/0026521 | A1 | 2/2006 | Hotelling et al. |
| 2006/0026535 | A1 | 2/2006 | Hotelling et al. |
| 2006/0097991 | A1 | 5/2006 | Hotelling et al. |
| 2006/0181517 | A1 | 8/2006 | Zadesky et al. |
| 2006/0197753 | A1 | 9/2006 | Hotelling |
| 2007/0294122 | A1 | 12/2007 | Johnston |
| 2008/0122796 | A1 | 5/2008 | Jobs et al. |
| 2009/0153288 | A1 | 6/2009 | Hope et al. |

OTHER PUBLICATIONS

Shahraray, B., et al., "Multimedia Processing for Advances Communications Services", Multimedia Communications, p. 510-523, 1999.

Gibbon, D., "Generating Hypermedia Documents from Transcriptions of Television Programs Using Parallel Text Alignment", Handbook of Int. & Multi. Systems and Appl., 1998.

Huang, Q., et al., "Automated Generation of News Content Hierarchy by Integrating Audio, Video and Text Information", Proc. IEEE INt'l. Confr. On Acoust., Sp., & Sig., 1999.

Shahraray, B., "Multimedia Information Retrieval Using Pictorial Transcripts", Handbook of Multimedia Computing, 1998.

"The FeedRoom", http://www.feedroom.com, Sep. 11, 2008.

"Psuedo", http://www.pseudo.com. Sep. 11, 2008.

"Medium4.com", http://medium4.com.

"Yahoo Finance Vision", http://vision.yahoo.com, Sep. 11, 2008.

"Choosing Your Next Handheld", Handheld Computing Buyer's Guide, Issue 3, 2001.

Raggett, D., "Getting Started with VoiceXML 2.0", http://www.w3.org/voice/guide/, Sep. 11, 2008.

"Windows Media Player 7 Multimedia File Formats", http://support.microsoft.com/default.aspx?scid=/support/mediaplayer.wmptest/wmptest.asp.

* cited by examiner

MULTIMODAL PORTABLE COMMUNICATION INTERFACE FOR ACCESSING VIDEO CONTENT

This application is a continuation of U.S. patent application Ser. No. 12/283,512, filed Sep. 12, 2008, which is incorporated by reference herein in its entirety.

BACKGROUND OF THE INVENTION

The present invention relates generally to wireless devices and more particularly to multimodal wireless devices for accessing video content.

As portable electronic devices become more compact and the number of functions performed by a given device increase, it has become a significant challenge to design a user interface that allows users to easily interact with a multifunction device. This challenge is particularly significant for handheld portable devices, which have much smaller screens than desktop or laptop computers. The user interface is the gateway through which users receive content and facilitate user attempts to access a device's features, tools, and functions. Portable communication devices (e.g., mobile telephones, sometimes called mobile phones, cell phones, cellular telephones, and the like) use various modes, such as pushbuttons, microphones, touch screen displays, and the like, to accept user input.

These portable communication devices are used to access wide varieties of content, including text, video, Internet web pages, and the like. Increasingly, very large volumes of content are available to be searched. However, the current portable communication devices lack adequate support systems and modalities to allow users to easily interface with the portable communication devices and access desired content.

Accordingly, improved systems and methods for using wireless devices to access content are required.

BRIEF SUMMARY OF THE INVENTION

The present invention generally provides methods for accessing media with a portable communication device. In one embodiment, the portable communication device has a touch screen display that receives tactile input and a microphone that receives audio input. The portable communication device initiates a query for media based at least in part on tactile input and audio input. The touch screen display is a multi-touch screen. The portable communication device sends an initiated query and receives a text response indicative of a speech to text conversion of the query. The query may be initiated by a user input, such as a button activation, touch command, or the like. The portable communication device then displays video in response to tactile input and audio input.

These and other advantages of the invention will be apparent to those of ordinary skill in the art by reference to the following detailed description and the accompanying drawings.

DETAILED DESCRIPTION

At least one embodiment of the present invention improves the user experience when accessing large volumes of video content. Mobile video services (e.g., Internet Protocol Television (IPTV) allows instant access to a wide range of video programming in a variety of usage contexts. Discussed below are systems that leverage the capabilities of modern portable communication devices to allow users to express their intent in a natural way in order to access the video and/or related content. Multimodal user interfaces could be used in systems for accessing video described by both traditional electronic program guide (EPG) metadata as well as enhanced metadata related to the content. As used herein, metadata and/or enhanced metadata is information related to media, such as closed caption text, thumbnails, sentence boundaries, etc.

Figure 1:
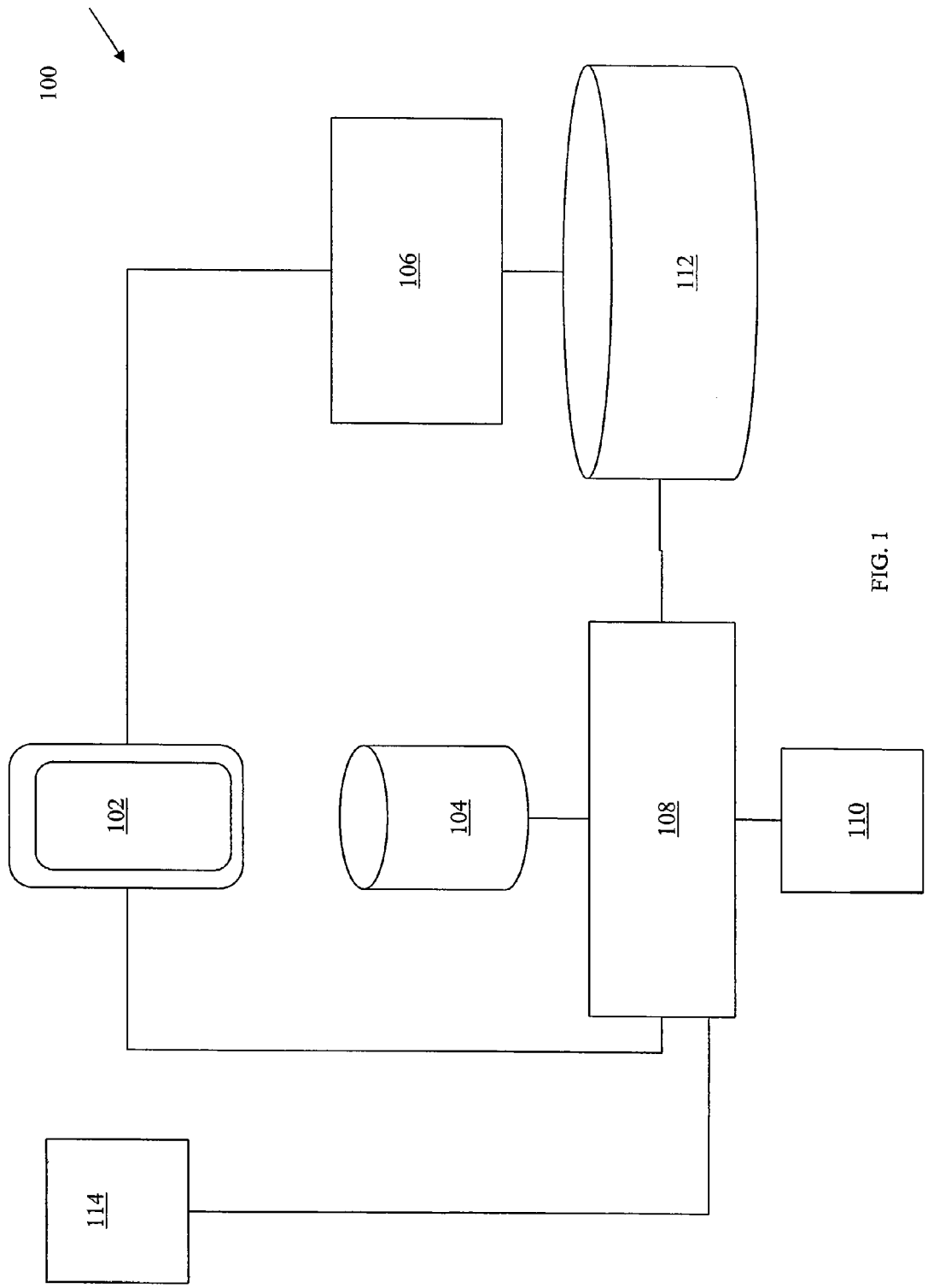
FIG. 1 depicts a media transmission system according to an embodiment of the present invention.

FIG. 1 depicts a media search and retrieval system 100 according to an embodiment of the present invention. Media search and retrieval system 100 includes a portable communication device 102. Portable communication device 102 is in communication with a multimodal portal 106 and/or a media processing engine 108. Multimodal portal 106 and/or media processing engine 108 are in communication with portable communication device 102 via any appropriate medium, such as a wireless network. That is, in at least one embodiment, portable communication device 102 has access to multimodal portal 106, and/or media processing engine 108 wirelessly using a Wi-Fi telecommunication network. In the same or alternative embodiments, media processing engine 108 is in communication with one or more display devices 114. As described herein, portable communication device 102 is "in communication with" other servers across a Wi-Fi, EDGE, 3G wireless, or other wireless network.

In a specific embodiment, portable communication device 102 uses Wi-Fi to talk to an Access Point (not shown) which is connected to the Internet. That is, the only wireless connection is to the Access Point. Portable communication device 102 fetches a web page from multimodal portal 106 or media processing engine 108 web servers over IP. Alternatively, portable communication device 102 uses the cellular network EDGE, which is second generation wireless, or 3G, which is third generation wireless, to access the Internet.

Multimodal portal 106 and/or media processing engine 108 are all connected via IP, such as a wired network or series of networks. A browser, such as the browser on the portable communication device 102, gets the web page via the URL from a web server (e.g., at multimodal portal 106 and/or media processing engine 108). The URL that the portable communication device 102 goes to actually corresponds to a proxy server that routes the domain/directory from the open Internet to a domain/directory inside a network firewall so that a web page can be developed within the firewall.

Effectively, multimodal portal 106 runs the proxy to route the traffic to a web server which could be in multimodal portal 106 or could be in media processing engine 108. In a specific embodiment, a static html page is retrieved that contains javascript. That javascript does all the work in handling the logic of the static web page. In at least one embodiment, only one page is used, but different views or anchors to the same page are shown. The javascript talks to the speech plugin, which sends the audio to the multimodal portal 106. The javascript gets the recognized speech back and shows it on the html page. Then AJAX is used to call the natural language understanding and database API to get the understanding and database results. When a user clicks on a TV icon on the details page as shown on the portable communication device 102, it loads a different page that has the logic to send video to the display device 114.

Media search and retrieval system 100 depicts an exemplary system for use in serving media content to a mobile device. One of skill in the art would recognize that any appropriate components and systems may be used in conjunction with and/or in replacement of the herein described media search and retrieval system 100. For example, media systems as described in related U.S. patent application Ser. No. 10/455,790, filed Jun. 6, 2003, and U.S. patent application Ser. No. 11/256,755, each of which incorporated herein by reference, may be used as appropriate.

Media archive 104 is in communication with media processing engine 108. Media processing engine 108 is also in communication with one or more media sources 110 and content database 112. Content database 112 may contain one or more models for use in the media search and retrieval system 100—namely a speech recognition model and a natural language understanding model.

In a specific embodiment, the portable communication device 102 client gets automatic speech recognition (ASR) back and sends that to understanding logic via an AJAX call. The understanding comes back and the portable communication device 102 client parses it to form the database query also via AJAX. Then the portable communication device 102 gets a list of shows that meet the search criteria back. Alternatively, the portable communication device 102 gets ASR, understanding, and database results all in one communication from multimodal portal 106 without having the portable communication device 102 client make those two AJAX calls. Multimodal portal 106 may still send back intermediate results.

In at least one embodiment, the static html page comes from a web server not shown in FIG. 1, but that could be in multimodal portal 106 or media processing engine 108. The proxy server on multimodal portal 106 routes the traffic to this web server. For simplicity, the ASR and NLU are described herein as coming from multimodal portal 106 and the database query goes to media processing engine 108. One of skill in the art would recognize that other network arrangements may be used.

Speech recognition may be performed in any specific manner. For example, in at least one embodiment speech recognition functions described herein are performed as described in related U.S. patent application Ser. No. 12/128,345, entitled "System and Method of Providing Speech Processing in User Interface," filed May 28, 2008 and incorporated herein by reference in its entirety.

Portable communication device 102 may be any appropriate multimedia communication device, such as a wireless, mobile, or portable telephone. For example, portable communication device 102 may be an iPhone, BlackBerry, SmartPhone, or the like. Components, features, and functions of portable communication device 102 are discussed in further detail below, specifically with respect to FIGS. 2 and 3.

Media processing engine 108 receives a query from portable communication device 102. Media archive 104 is any appropriate storage and/or database for storing requested media. The requested media is received at the media archive 104 from the media processing engine 108. Accordingly, media processing engine 108 is any appropriate computer or related device that receives media from the media sources 110 and generates media clips, segments, chunks, streams, and/or other related portions of media content. Media generation, chunking, and/or segmenting may be performed in any appropriate manner, such as is described in related U.S. patent application Ser. No. 10/455,790, filed Jun. 6, 2003, incorporated herein by reference. Media sources 110 may be any appropriate media source feeds, such as channel feeds, stored channel content, archived media, media streams, satellite (e.g., DirecTV) feeds, user generated media and/or web content, podcasts, or the like. In alternative embodiments, other databases may be used as media sources 110. For example, media sources 110 may include a database of movies in a movies-on-demand system, a business (e.g., restaurant, etc.) directory, a phonebook, a corporate directory, or the like. Though discussed herein in the context of searching for and/or displaying video based on content, title, genre, channel, etc., one of skill in the art would recognize that other available databases may be used as media sources 110. Accordingly search terms and/or displays (e.g., as queries 402, etc.) may include different speech recognition models, understanding models, and button labels, and/or information for actors, directors, cuisine, city, employee information, personnel information, corporate contact information, and the like.

Multimodal portal 106 may be any appropriate device, server, or combination of devices and/or servers that interfaces with portable communication device 102 regarding speech to text conversion. That is, multimodal portal 106 performs speech to text conversion processes in accordance with features of the present invention discussed below. To accomplish such conversion, multimodal portal 106 receives speech from portable communication device 102 to convert speech to text. Accordingly, multimodal portal 106 may include componentry for automatic speech recognition. In at least one embodiment, this automatic speech recognition is a web-based application such as one using the Watson automatic speech recognition engine. Multimodal portal 106 may also include componentry for natural language understanding. Of course, automatic speech recognition and/or natural language understanding may also be performed at another location, such as a web server (not shown) or media processing engine 108. For simplicity, it is described herein as being performed at multimodal portal 106, but, in some embodiments, is performed elsewhere.

The automatic speech recognition and natural language understanding use models based on information (e.g., show title, genre, channel, etc.) from content database 112. In at least one embodiment, models are used that correspond to inputs (e.g., requests, queries, etc.) from portable communication device 102. For example, as will be discussed further below with respect to method 500 of FIG. 5, a speech input on portable communication device 102 may be in response to a specific request type and an appropriate model to address that request type may be employed at multimodal portal 106 and/or content database 112.

In a specific example, a title button (discussed below with respect to FIG. 4) may be pressed on portable communication device 102 and speech corresponding to a user-input title may be sent to multimodal portal 106; a title model at multimodal portal 106 may address the user-input speech based on title information from the content database 114. The model recognizes the speech input from portable communication device 102 and returns the recognized title to portable communication device 102 for display. A user may then initiate a search (e.g., by pressing a search button), which sends the title to the language understanding component which parses the exact title and executes a query to be issued to media processing engine 108 using that exact title.

In the same or alternative embodiments, other models may be used that correspond to genre, channel, content, time, or other categories.

Display device 114 may be any appropriate device for displaying media received from media processing engine 108. In some embodiments, portable communication device 102 is used to initiate and/or control display of media at display device 114. That is, display device 114 may be a television, computer, video player, laptop, speaker, audio system, digital video recorder, television streaming device, and/or any combination thereof. In at least one example, display device 114 is a television and/or related equipment using Windows Vista Media Center to receive and display media content from portable communication device 102.

Figure 2:
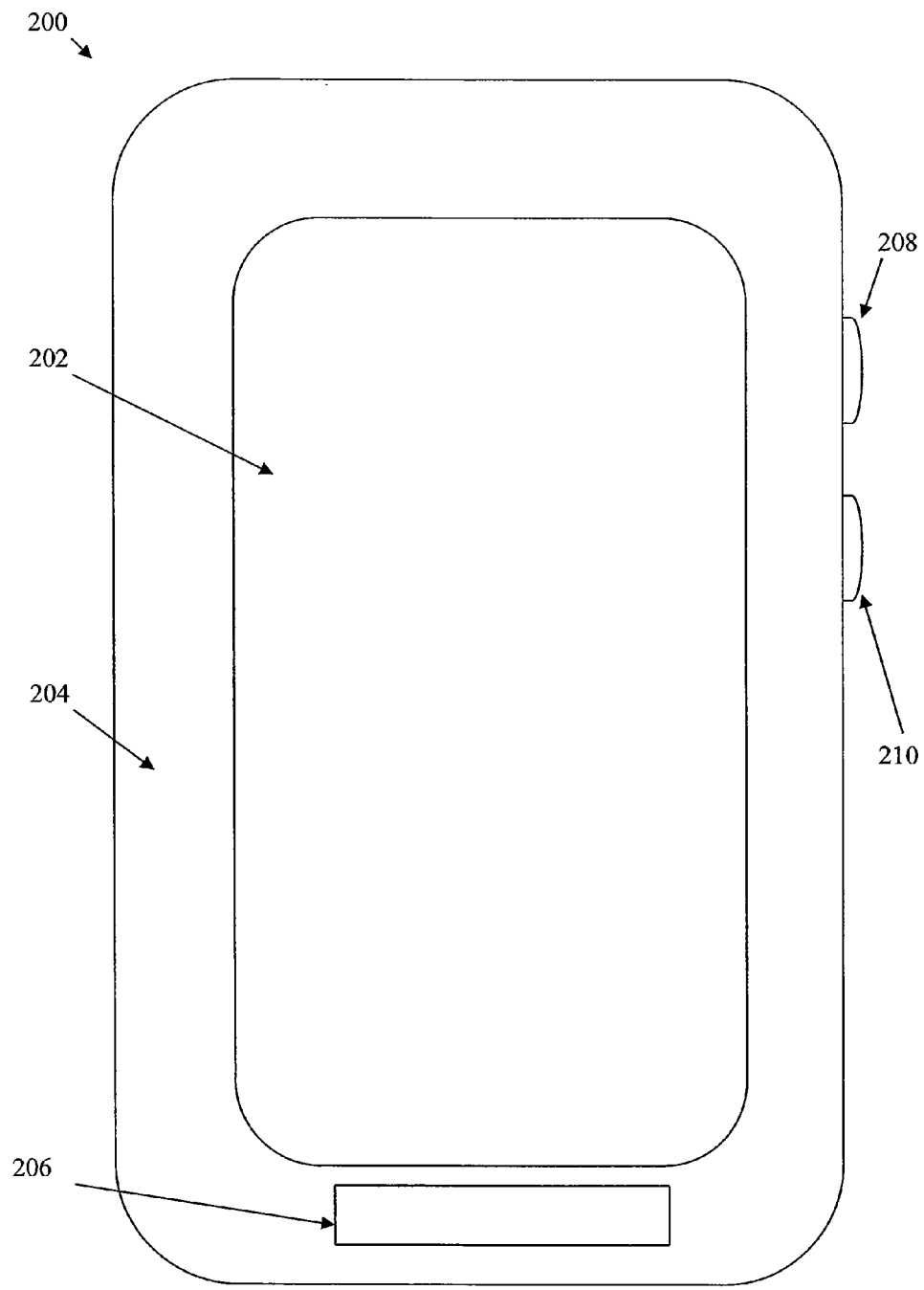
FIG. 2 is a front view of a portable communication device according to an embodiment of the present invention.

FIG. 2 is a front view of a portable communication device 200 according to an embodiment of the present invention. Portable communication device 200 may be used in media search and retrieval system 100 as portable communication device 102, described above with respect to FIG. 1.

Portable communication device 200 may be any appropriate multimedia communication device, such as a wireless, mobile, or portable telephone. For example, portable communication device 102 may be an iPhone, BlackBerry, SmartPhone, or the like. One of skill in the art would recognize that myriad devices could be modified and improved to incorporate the features of and perform the functions of portable communication device 200. For example, an iPhone could be modified to include a speech application or widget that would enable the iPhone to be used as portable communication device 200.

Portable communication device 200 has a touch screen display 202 in a housing 204. Portable communication device 200 also includes a microphone 206. In at least one embodiment, Portable communication device 200 has additional modal inputs, such as thumbwheel 208 and/or one or more buttons 210. In at least one embodiment, a button 210 may be a walkie-talkie (e.g., push-to-talk) style button. In such an embodiment, speech entry may be performed by pressing the button, speaking into the microphone 206, and releasing the button when the desired speech has been entered. Such an embodiment would simplify user input by not requiring touch screen display 202 or other tactile entry both before and after speech input. Any other appropriate inputs may also be used.

Touch screen display 202 may be any appropriate display, such as a liquid crystal display screen that can detect the presence and/or location of a touch (e.g., tactile input) within the display area. In at least one embodiment, display 202 is a multi-touch screen. That is, display 202 is a touch screen (e.g., screen, table, wall, etc.) or touchpad adapted to recognize multiple simultaneous touch points. Underlying software and/or hardware of portable communication device 200, discussed below with respect to FIG. 3, enables such a display 202.

Housing 204 may be any appropriate housing or casing designed to present display 202 and/or other inputs, such as microphone 206, thumbwheel 208, and/or buttons 210.

The additional modal inputs—microphone 206, thumbwheel 208, and/or buttons 210—may be implemented using any appropriate hardware and/or software. One of skill in the art would recognize that these general components may be implemented anywhere in and/or on portable communication device 200 and the presentation in FIG. 2 is for representative depiction. Other inputs and/or locations for inputs may be used as necessary or desired.

Figure 3:
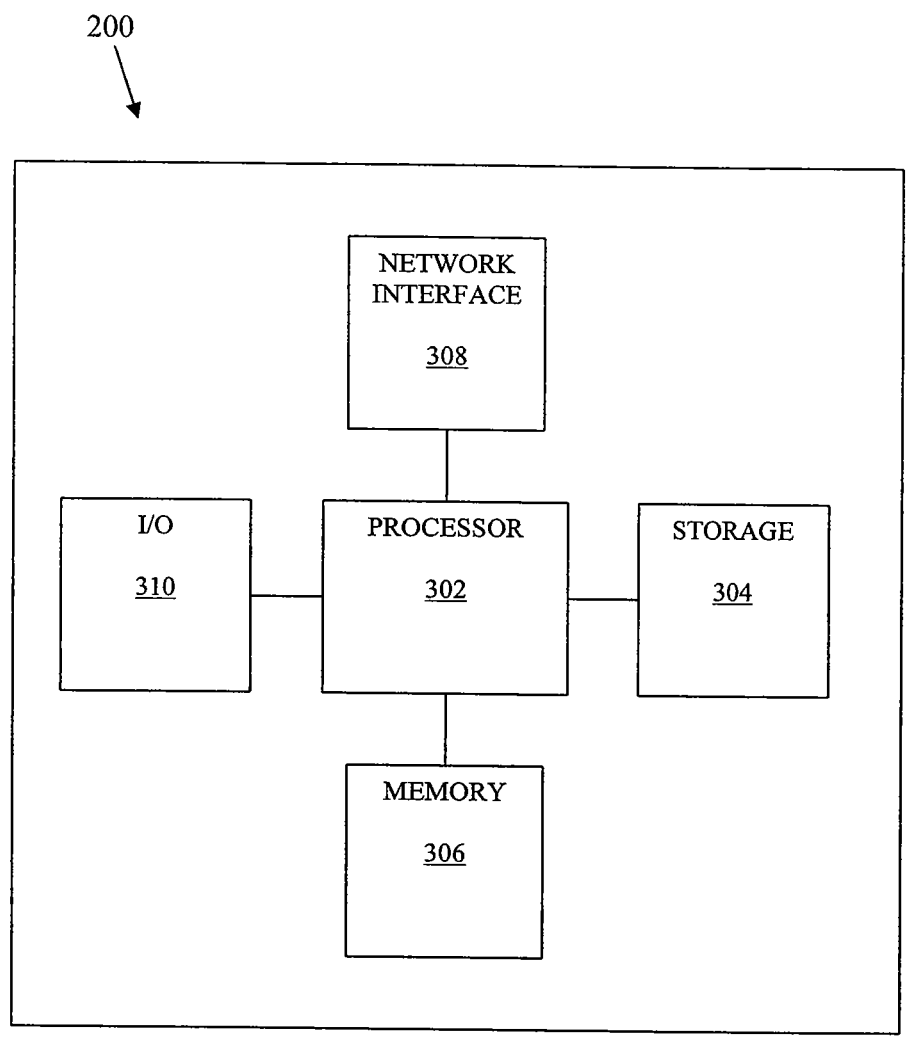
FIG. 3 is a schematic drawing of the underlying architecture of a portable communication device according to an embodiment of the present invention.

FIG. 3 is a schematic drawing of the underlying architecture (e.g., a controller) of portable communication device 200 according to an embodiment of the present invention.

Portable communication device 200 contains devices that form a controller including a processor 302 that controls the overall operation of the portable communication device 200 by executing computer program instructions, which define such operation. The computer program instructions may be stored in a storage device 304 (e.g., magnetic disk, FLASH, database, RAM, ROM, etc.) and loaded into memory 306 when execution of the computer program instructions is desired. Thus, applications for performing the herein-described method steps, such as those described below with respect to method 500 are defined by the computer program instructions stored in the memory 306 and/or storage 304 and controlled by the processor 302 executing the computer program instructions. The portable communication device 200 may also include one or more network interfaces 308 for communicating with other devices via a network (e.g., media search and retrieval system 100). The portable communication device 200 also includes input/output devices 310 (e.g., microphone 206, thumbwheel 208, buttons 210, and/or a remote receiver, such as a Bluetooth headset, etc.) that enable user interaction with the portable communication device 200. Portable communication device 200 and/or processor 302 may include one or more central processing units, read only memory (ROM) devices and/or random access memory (RAM) devices. One skilled in the art will recognize that an implementation of an actual computer for use in a portable communication device could contain other components as well, and that the portable communication device of FIG. 3 is a high level representation of some of the components of such a portable communication device for illustrative purposes.

According to some embodiments of the present invention, instructions of a program (e.g., controller software) may be read into memory 306, such as from a ROM device to a RAM device or from a LAN adapter to a RAM device. Execution of sequences of the instructions in the program may cause the portable communication device 200 to perform one or more of the method steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 306 may store the software for the portable communication device 200, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

Figure 4:
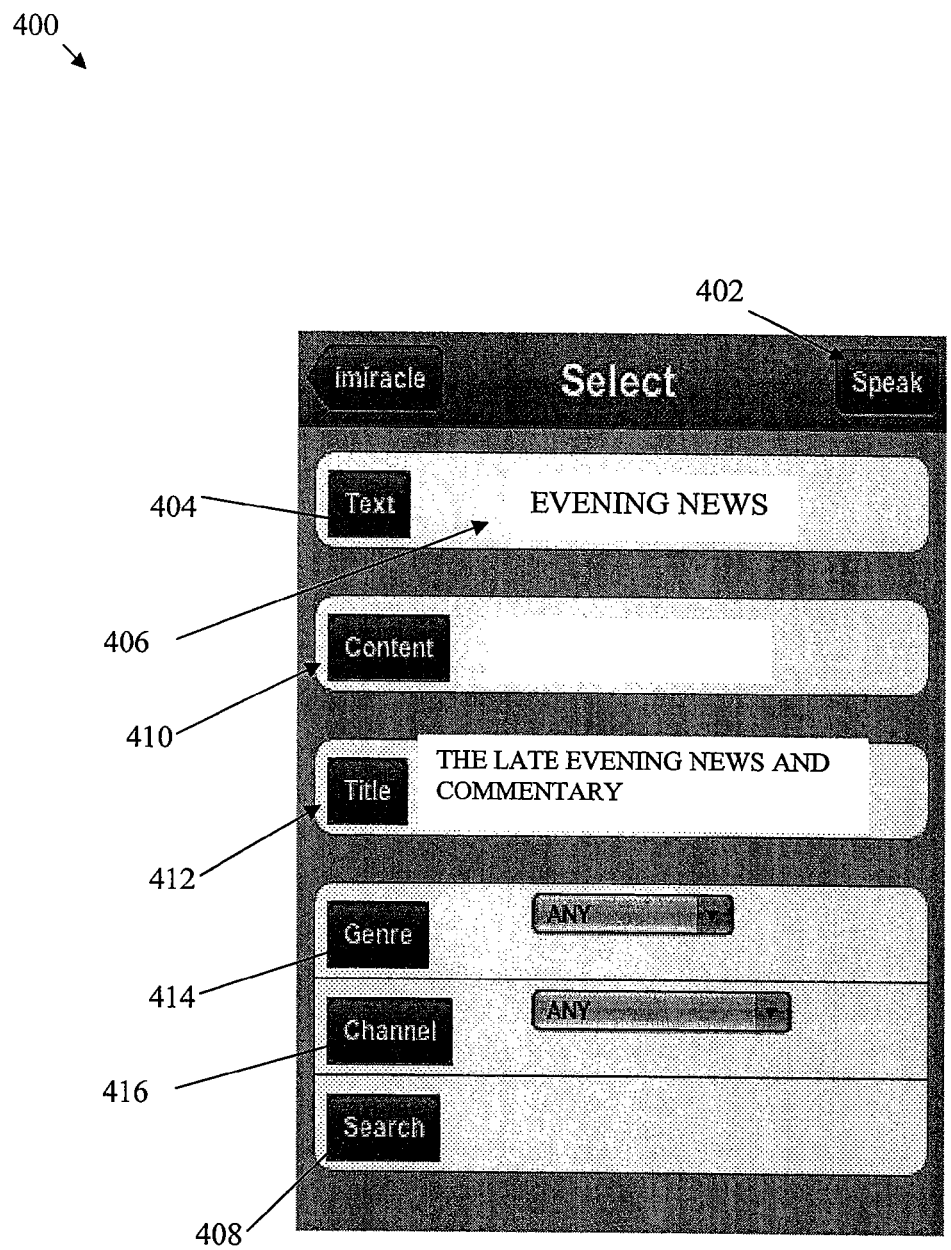
FIG. 4 is a front view of an exemplary display for view on a portable communication device.

FIG. 4 is a front view of an exemplary display 400 for view on portable communication device 200. That is, display 400 shows one possible graphical user interface (GUI) that may be displayed on display 202 of portable communication device 200.

Display 400 includes a speak button 402. In at least one embodiment, speak button 402 is implemented by processor 302 of FIG. 3 and, when speak button 402 is touched or otherwise activated, initiation and/or termination of procurement of speech from a user is enabled. That is, when speak button 402 is touched or otherwise activated, speech recording is begun and/or ended. One of skill in the art would recognize that speak button 402 location and depiction is exemplary.

Display 400 also includes a text button 404. Text button 404 allows the user to enter text to the right of the button to build the entire query. The user then touches the text button 404 to send the query to the understanding component. In at least one embodiment, if a user uses a one-step speak button 402 operation, the recognition result shows up in a text button 404 text field 406.

Display 400 also includes a search button 408. Search button 408 takes the input from the content button 410, title button 412, genre button 414, and channel button 416 and builds a string to send to the understanding component. In at least one embodiment, content button 410, title button 412, genre button 414, and channel button 416 may be pressed by a user as a touch button. This tactile input may initiate a speech recording, may cause a pull-down list to be displayed, and/or may otherwise provide information to and/or collect information from a user. Conventional web browsing and/or searching may be engaged by content button 410, title button 412, genre button 414, and channel button 416, such as enabling text and/or speech entry, displaying lists, and/or any other appropriate feature.

For example, a user may touch content button 410, title button 412, genre button 414, and/or channel button 416 and the labels of the button will change to STOP. The user speaks and then touches the content button 410, title button 412, genre button 414, and channel button 416 again (e.g., touches the button labeled as STOP), and the label goes back to its original label (e.g., content, title, genre, channel).

The recognition result gets filled into a corresponding text field (e.g., each of content button 410, title button 412, genre button 414, and channel button 416 may have its own associated text field similar to text field 406) or pull down. If use speak button 402, the text in text field 406 will be filled in with the recognition or the user can type in text. In one example, if a user entered "Evening News" using the speak button 402, then the text field associated with title button 412 is filled in with the actual exact title corresponding to the "Evening News"—"The Late Evening News and Commentary", for example. Anything input via speech or otherwise will be used to build the string sent to the understanding component which then can be used to build the actual database query, such as with a query API to media processing engine 108 that returns the result in XML, which is parsed by the portable communication device 102. In another implementation, the exact title is filled into the text field next to title button 412 after the understanding data is parsed since it will contain the exact title, genre, channel, etc.

Display 400 may display a GUI designed specifically for media searching. This GUI may be based off a traditional Internet browser (e.g., Safari, Firefox, Chrome, etc.) that includes a speech plug-in. In other embodiments, the speech plug-in may be an application used in coordination with display 400 and/or processor 302 of FIG. 3.

In coordination with display 400, buttons 210, and/or touch buttons (e.g., content button 410, title button 412, genre button 414, and/or channel button 416), audio can be recorded. A user touches a button (e.g., button 210, touch buttons 410-416, etc.) to speak and touches the same button to stop speaking. In some embodiments, associated audio file is sent to the multimodal portal 106 for recognition. In other embodiments, audio is streamed to the multimodal portal 106 and a response is sent to portable communication device 102 after endpointing so the user does not need to touch a button to stop the recording. The detection of silence after the spoken query will indicate that the user is finished. As discussed above, the information associated with the recorded or streamed speech is then used to populate and/or suggest populations for text field associated with content button 410, title button 412, genre button 414, and/or channel button 416.

Figure 5:
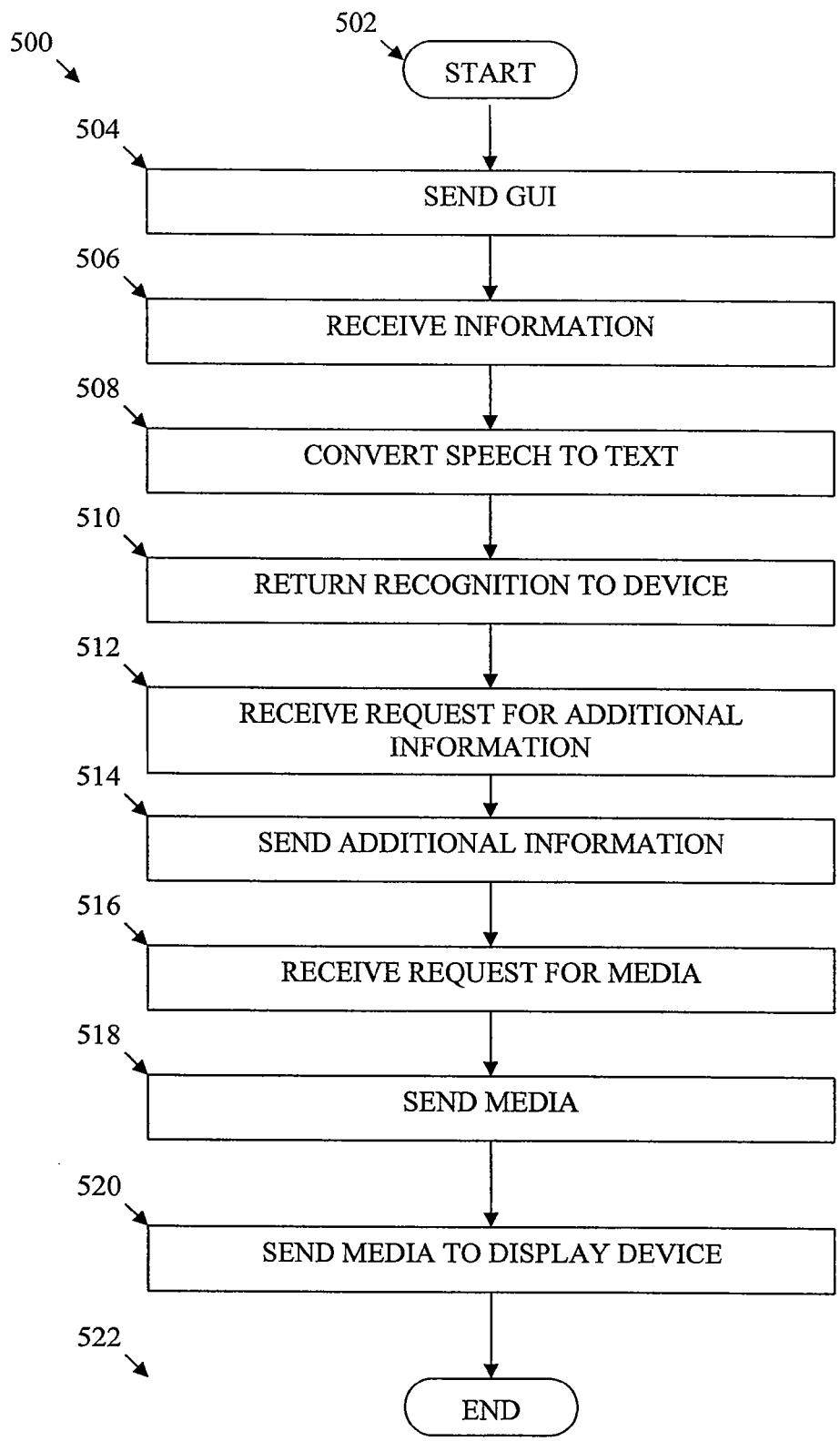
FIG. 5 is a flowchart of a method of accessing media with a portable communication device according to an embodiment of the present invention.

FIG. 5 is a flowchart of a method 500 of accessing media with a portable communication device according to an embodiment of the present invention. Portable communication devices 102 and/or 200 may be used to access media via media search and retrieval system 100. The method 500 starts at step 502.

In step 504, a graphical user interface is sent to and displayed on portable communication device 102/200. The GUI may be a display 400 as shown above in FIG. 4. That is, the GUI may be a web page for display on a browser on portable communication device 102 as described above.

In step 506, information is received from the portable communication device 102/200. In at least one embodiment, the information is received at multimodal portal 106. In at least one embodiment, the information is audio input entered at the portable communication device using microphone 206 in response to activating speak button 402. That is, in response to a command (e.g., a tactile input using display 202/400 or button 210, etc.), audio is received at microphone 206 and recorded. In an alternative embodiment, information entered using another mode, such as using a keyboard displayed on display 202/400, is received with or in addition to the audio. In the embodiment shown in FIG. 4, the information is a request based on use of speak button 402 for a particular title, genre, channel, time or content. That is, the information is an audio recording of what the user would like to look up. Of course, any other appropriate entry may be used. For example, an artist, actor, directory, keyword, content, time, theme, etc. may be entered as audio and/or using text. In this way, any type of media (e.g., video, audio, text, etc.) may be accessed. In the example in FIG. 4, a user activates speech recording associated with the "Title" section (e.g., using a touch button 412 associated with the "Title" section, using a button 210, etc.) and speaks the words "Evening News" into the microphone 206.

For each piece of information to be received, such as time, keyword, content, etc., a separate touch button 410-416 can be enabled on display 400. In the same or alternative embodiments, other commands may be entered in conjunction with tactile and/or audio commands without the used of additional buttons. A word or phrase may then be entered by touching the touch button 410-416 associated with each keyword, time, content, etc.

In step 508, if the information is an audio recording, the audio (e.g., speech) is converted to text. In the example in FIG. 4, the audio of the word "Evening News" is forwarded to multimodal portal 106 and the speech is converted to text.

In step 510, recognition (e.g., speech converted into text) of the information received in step 508 is returned to portable communication device 102.

In step 512, a request for further information is received from portable communication device 102 based on the returned recognition. As described above, the recognition result may be sent back to multimodal portal to retrieve more information.

In step 514, additional information is sent to the portable communication device 102. In some embodiments, the additional information is the result of a database query, which in this case could display the list of programs that satisfy the database query, or the additional information could be the detailed information about a particular program.

In embodiments in which the recognition is initially sent back to the portable communication device 102, portable communication device 102 may issue a request (e.g., as a result of user input or without input) to receive information about the recognized speech. Iterative refinement of the search may be enacted at any point in method 500 to require and/or prompt user to enter more information by tactile input, by speech input, or by a combination of both tactile and speech input.

In at least one embodiment, arrays are used at multimodal portal 106 to map the different ways titles, genre, and channels are displayed on portable communication device 102. This array could be loaded from the content description database when the portable communication device 102 loads the application page before the user interacts with it. This is used to coordinate common search terms with their complete information. For example, if the query issued in step 508 is a title "Jay Leno", an array maps to the complete title "The Tonight Show with Jay Leno."

In the example in FIG. 4, the title "The Late Evening News and Commentary" is returned as a title to portable communication device 102 based on an initial search for "Evening News". This return may be based on an array or other lookup as discussed above.

In some embodiments, after the returned information is displayed, a subsequent request may be made by portable communication device 102 to retrieve more information based on the received recognition as in steps 512 and 514 above. In the example of FIG. 4, the recognition "Evening News" is sent back to the multimodal portal 106. Information related to the query "Evening News" is looked up, as described above, and the complete title "The Late Evening News and Commentary" is displayed in the query results 406 section for the user. In some embodiments, the user may be prompted with various options (e.g., via dynamically generated pull-down menus) related to the returned information. For example, if multiple content descriptions could be related to the original query, choices of titles, genres, shows, times, etc. may be displayed for the user on display 202/400.

In step 516, a request for media is received. In some embodiments, the query is in response to a further user input, such as a tactile command (e.g., touching search button 408) or further audio input using microphone 206. In alternative embodiments, the query for media is made automatically after receiving the recognition in step 510. The query for media is made from portable communication device to multimodal portal 106. The query for media includes the information that was returned in step 510. That is, information (e.g., title, genre, channel, etc.) related to the original speech input that was found in steps 510 and 512 is sent to multimodal portal 106, which accesses media processing engine 108 to retrieve appropriate media.

In the same or alternative environments, after the returned information is displayed in step 514, details of the returned information may be displayed on display 400. An example of such a detail display is shown below in FIG. 6.

In step 518, media is received at the portable communication device 102. Media may be sent using any available method. In some embodiments, clips, segments, chunks, or other portions of video, audio, and/or text are sent to portable communication device 102. In alternative embodiments, video, audio, and/or text are streamed to portable communication device 102.

Media sent to portable communication device 102 in step 518 may be acquired directly from media sources 110 or from media processing engine 108 as appropriate. This media may be directly displayed on display 202/400.

In step 520, media is sent to another media device, such as display device 114. This display is in response to an input by a user at display 400. An example of a link to display video on another media device (e.g., display device 114) is shown below in FIG. 7. The media is sent to the other media device (e.g., display device 114) from media sources 110 or from media processing engine 108, as appropriate.

The method ends at step 522. In this way, multimodal input, including speech input, may be used for media searching, access, and display in coordination with existing portable communication devices (e.g., Apple's iPhone) and/or video archiving systems (e.g., AT&T's Miracle System).

Figure 6:
FIG. 6 depicts a display of returned information according to an embodiment of the present invention.

FIG. 6 depicts a display 600 of returned information according to an embodiment of the present invention. Display 600 may be used as display 400. That is, display 600 may be a GUI displayed on portable communication device 102 and may include one or more touch buttons 402 or other buttons. Display 600 shows information returned in step 514 of method 500. That is, display 600 displays information regarding shows related to the queries made in method 500.

Figure 7:
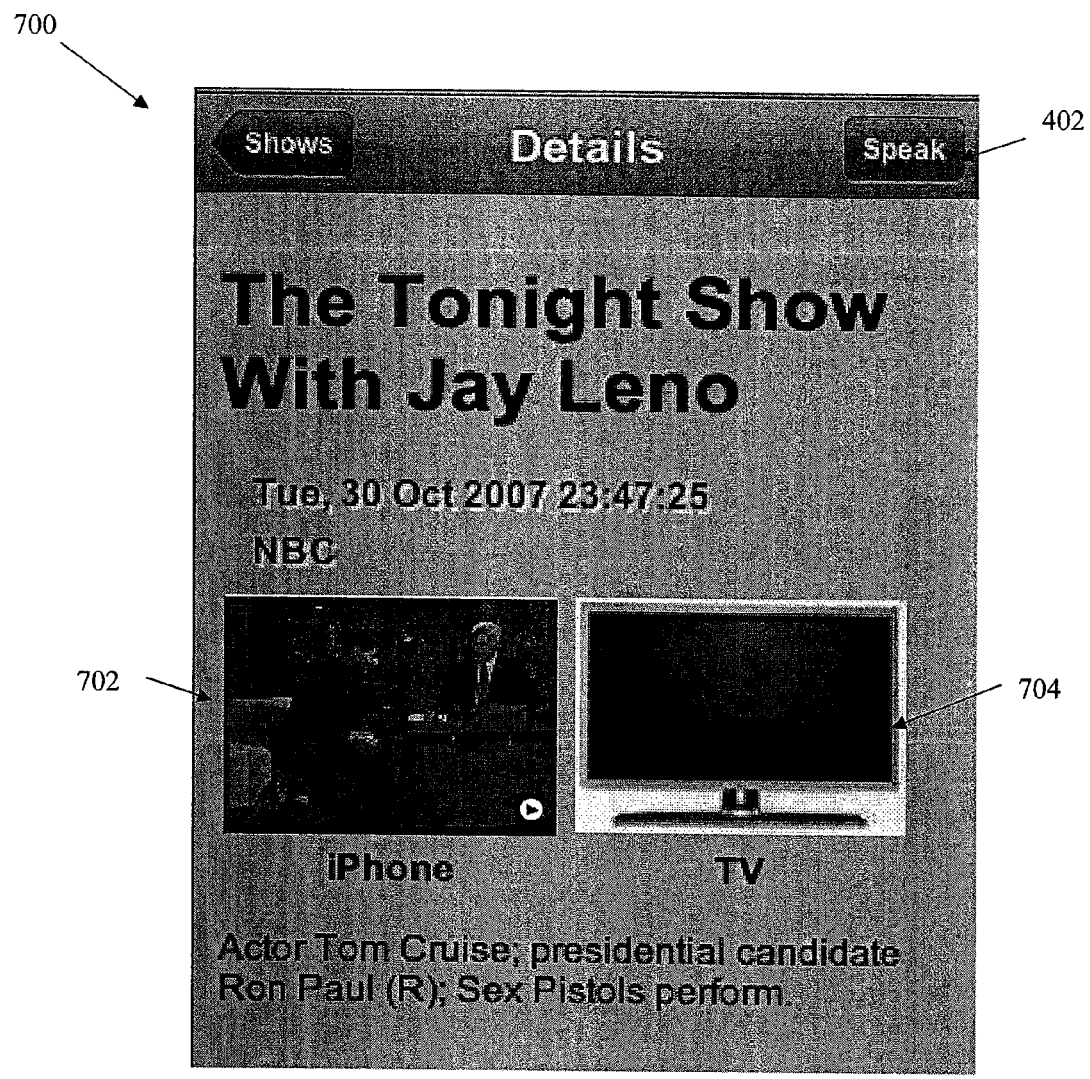
FIG. 7 depicts a display of returned information according to an embodiment of the present invention.

FIG. 7 depicts a display 700 of returned information according to an embodiment of the present invention. Display 700 may be used as display 400. That is, display 700 may be a GUI displayed on portable communication device 102 and may include one or more touch buttons 402 or other buttons. Display 700 shows media available (e.g., the media sent in step 518). In at least one embodiment, display 700 includes a link 702 to play the media on the portable communication device 102 and/or a link 704 to play the media on display device 114. Clicking on link 704 brings up a separate web page on portable communication device 102 while the video starts playing on the display device 114. That web page has controls to pause/resume, play, stop, increase/decrease volume, mute, fast forward, rewind, or to skip to a certain offset within the video. In this way, the user can control the display device 114.

The above described method may also be used to allow a portable communication device 102 to be used as a television and/or computer remote control, to control a digital video recorder (DVR), or to perform other similar functions. That is, the display 202/400 may be configured using an appropriate GUI to represent a remote control for a television or DVR. In this way multimodal input, including speech input, may be used for controlling television viewing and recording as well as searching for shows to display or record.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. A method for accessing media comprising:
   generating a query at a portable communication device, the query for video media and based on a first received tactile input and parsed text based on a first received audio input;
   transmitting the query to a multimodal portal;
   receiving a text response in response to the query, the text response identifying video media based on the query;
   transmitting a request for additional information related to the text response based on a second tactile input;
   receiving the additional information based on the request for additional information; and
   transmitting a command to transmit video to a device in response to a third tactile input and a second received audio input.

2. The method of claim 1 further comprising:
   transmitting the first received audio input to the multimodal portal; and
   receiving extensible markup language text from the multimodal portal based on text conversion of the first received audio input.

3. The method of claim 2 further comprising:
   parsing the extensible markup text to generate the parsed text.

4. The method of claim 1 further comprising:
   displaying a graphical user interface on a touch screen display of the portable communication device for controlling display of video via the device.

5. An apparatus for accessing media comprising:
   a touch screen display adapted to receive tactile input;
   a microphone adapted to receive audio input;
   a memory storing computer program instructions;
   a processor communicatively coupled to the touch screen display, the microphone, and the memory, the processor configured to execute the computer program instructions, which, when executed on the processor, cause the processor to perform operations comprising:
      generating a query for video media, the query based on a first received tactile input and parsed text based on a first received audio input;
      transmitting the query to a multimodal portal;
      receiving a text response in response to the query, the text response identifying video media based on the query;
      transmitting a request for additional information related to the text response based on a second tactile input;
      receiving the additional information based on the request for additional information; and
      transmitting a command to transmit video to a device in response to a third tactile input and a second received audio input.

6. The apparatus of claim 5 wherein the operations further comprise:
   transmitting the first received audio input to the multimodal portal; and
   receiving extensible markup language text from the multimodal portal based on text conversion of the first received audio input.

7. The apparatus of claim 6 wherein the operations further comprise:
   parsing the extensible markup text to generate the parsed text.

8. The apparatus of claim 5 wherein the operations further comprise:
   displaying a graphical user interface on the touch screen display of the portable communication device for controlling display of video via the device.

9. The apparatus of claim 5 wherein the touch screen display is further adapted to display video in response to a received tactile input and a received audio input.

10. A method of accessing media, the method comprising:
    receiving a query for video media at a multimodal portal, the query based on a first tactile input received at a portable communication device and parsed text based on a first audio input received at the portable communication device;
    querying a database based on the query;
    sending a text response identifying video media, the text response based on results of querying the database;
    receiving a request for additional information related to the text response based on a second tactile input received at the portable communication device;
    transmitting the additional information based on the request for additional information; and
    receiving a command to transmit video to a device in response to a third tactile input and a second audio input.

11. The method of claim 10 further comprising:
    receiving the first audio input; and
    transmitting extensible markup language text to the portable communications device based on text conversion of the first audio input.

12. The method of claim 10 further comprising:
    receiving a command to control display of video via the device.

* * * * *